(12) United States Patent
Baita et al.

(10) Patent No.: US 7,678,867 B2
(45) Date of Patent: Mar. 16, 2010

(54) PROCESS FOR THE (CO)POLYMERIZATION OF ETHYLENE

(75) Inventors: Pietro Baita, Occhiobello (IT); Massimo Covezzi, Ferrara (IT); Gabriele Mei, Ferrara (IT); Giampiero Morini, Padua (IT); Joachim T. M. Pater, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/581,983

(22) PCT Filed: Nov. 24, 2004

(86) PCT No.: PCT/EP2004/013372

§ 371 (c)(1), (2), (4) Date: Jun. 7, 2006

(87) PCT Pub. No.: WO2005/058982

PCT Pub. Date: Jun. 30, 2005

(65) Prior Publication Data

US 2007/0282083 A1 Dec. 6, 2007

Related U.S. Application Data

(60) Provisional application No. 60/532,128, filed on Dec. 22, 2003.

(30) Foreign Application Priority Data

Dec. 19, 2003 (EP) .................................. 03104854

(51) Int. Cl.
C08F 4/64 (2006.01)
C08F 4/642 (2006.01)
C08F 4/649 (2006.01)
C08F 210/02 (2006.01)

(52) U.S. Cl. .................. 526/124.9; 526/65; 526/125.3; 526/348; 525/240

(58) Field of Classification Search .................. 526/65, 526/124.9, 125.3, 348; 525/240
See application file for complete search history.

(56) References Cited

U.S. PATENT DOCUMENTS

| | | | |
|---|---|---|---|
| 4,298,718 A | 11/1981 | Mayr et al. | |
| 4,399,054 A | 8/1983 | Ferraris et al. | |
| 4,469,648 A | 9/1984 | Ferraris et al. | |
| 4,495,338 A | 1/1985 | Mayr et al. | |
| 4,829,034 A | 5/1989 | Iiskolan et al. | |
| 5,100,849 A | 3/1992 | Miya et al. | |
| 5,204,303 A * | 4/1993 | Korvenoja et al. | 502/9 |
| 5,908,679 A | 6/1999 | Berthold et al. | |
| 5,990,251 A * | 11/1999 | Gelus | 526/125.7 |
| 6,191,239 B1 * | 2/2001 | Ford et al. | 526/123.1 |
| 6,221,982 B1 | 4/2001 | Debras et al. | |
| 7,371,802 B2 | 5/2008 | Gulevich et al. | |
| 2007/0265401 A1 | 11/2007 | Penzo et al. | |

FOREIGN PATENT DOCUMENTS

| | | |
|---|---|---|
| EP | 395083 | 10/1990 |
| EP | 503791 | 4/1997 |
| EP | 739937 | 5/2001 |
| JP | 63075009 | * 4/1988 |
| WO | 88/02376 | 4/1988 |
| WO | 98/44009 | 10/1998 |
| WO | 00/02929 | 1/2000 |
| WO | 2004/000895 | 12/2003 |
| WO | 2005/047351 | 5/2005 |
| WO | 2005/058979 | 6/2005 |

OTHER PUBLICATIONS

D. Geldart, "Gas Fluidisation Technology," p. 155 (1986) J. Wiley & Sons.

* cited by examiner

*Primary Examiner*—Caixia Lu
(74) *Attorney, Agent, or Firm*—William R. Reid

(57) ABSTRACT

A process for preparing a broad molecular weight polyethylene carried out in the presence of a catalyst system comprising (i) a solid catalyst component comprising Mg, Ti, halogen, and optionally an internal electron donor compound, and (ii) an Al-alkyl cocatalyst said process comprising at least two step of polymerization (a) and (b), in which:

in a first step (a) ethylene is polymerized in the presence of a molecular weight regulator in order to produce a ethylene (co)polymer, and in a further step (b), which is carried out in the presence of an external electron donor compound added to this polymerization step as a fresh reactant, ethylene is copolymerized with an alpha olefin of formula $CH_2=CHR$, in which R is a C1-C20 hydrocarbon group, to produce an ethylene copolymer having a molecular weight higher than that of the copolymer produced in step (b).

16 Claims, No Drawings

PROCESS FOR THE (CO)POLYMERIZATION OF ETHYLENE

This application is the U.S. national phase of International Application PCT/EP2004/013372, filed Nov. 24, 2004, claiming priority to European Patent Application 03104854.9 filed Dec. 19, 2003, and the benefit under 35 U.S.C. 119(e) of U.S. Provisional Application No. 60/532,128, filed Dec. 22, 2003; the disclosures of International Application PCT/EP2004/013372, European Patent Application 03104854.9 and U.S. Provisional Application No. 60/532,128, each as filed, are incorporated herein by reference.

The present invention relates to a process for the gas-phase polymerization of ethylene, particularly to a gas-phase polymerization process for obtaining high density polyethylene (HDPE) endowed with excellent physical properties. The obtained polyethylene is particularly suitable for producing items endowed with enhanced stress-crack resistance, such as pipes, blow and injection molded articles.

Generally speaking for polyolefins and in particular for polyethylene, the molecular weight (MW) and the molecular weight distribution (MWD) are fundamental characteristics affecting the physical, and in particular the mechanical properties of the polymer and thus its applications. It is generally recognized in the art that the higher the molecular weight, the higher the mechanical properties. However, polyolefins with a high molecular weight can be difficult to process, due to their poor flowability properties. The latter can be a serious disadvantage in all those applications requiring a rapid transformation at high shear-rate, for example in blowing and extrusion techniques. In order to improve the rheological properties, while maintaining superior mechanical properties of the final products, it is known in the art to broaden the molecular weight distribution of the polyethylene: the high molecular weight (HMW) fraction contributes to enhance the mechanical properties, the low molecular weight (LMW) fraction helps the processing of the polymer.

Higher toughness, strength and stress-crack resistance are required for many high density polyethylene (HDPE) applications and in particular for pipes that are required to have high values of full notch creep test (FNCT). In addition to these superior mechanical properties, it is important to keep under control production costs, by limiting the use of energy and by increasing the processing yields. A known solution for these requirement is the manufacture of high molecular weight HDPE having bimodal or multimodal MWD, i.e. the polymer has two or more distinct ranges of molecular weight and this gives the best answer to the said requirements. This kind of polymers is particularly suitable for producing pipes, films, blow and injection molded articles.

By using two reactors in series with Ziegler/Natta catalyst systems and tailoring the process conditions, it is possible to produce a wide range of high density polyethylene having a broad MWD, and in particular a bimodal MWD. In fact, each reactor can work at different polymerization conditions, in terms of catalyst, pressure, temperature, monomer(s) and molecular weight regulator(s) concentration. EP 0 503 791 is an example of this technical solution and describes a process for producing bimodal ethylene polymer compositions comprising a mixture of relatively high and low molecular weight polymers by means of two gas-phase, fluidized bed reactors in series. A similar two-step polymerization process is also carried out according to U.S. Pat. No. 6,221,982 in two liquid phase loop reactors connected in series. Moreover, this latter reference, and EP 739937 as well, indicate the suitability of including a higher amount of comonomer into the polymer fraction having the relatively higher molecular weight.

It is generally known that Ziegler-Natta heterogeneous catalysts generally provide a not particularly suitable comonomer distribution in and among the polymer chains thereby producing ethylene polymers not having first class quality in terms of mechanical properties. On the other hand, the attempt of improving the capability of the catalyst to homogeneously distribute the comonomer by including in the solid catalyst component modifying agents such as electron donor compounds, has often an important downside in this technical field. It can reduce the hydrogen sensitivity of the catalyst, that is, the capability of the catalyst to produce polymers with lower molecular weight when hydrogen is present. This would require higher hydrogen concentration in the polymerization step in which the relatively low molecular weight polymer is produced with a consequent negative impact on the activity of the catalyst.

It would therefore be important to find an efficient process capable of producing a broad molecular weight ethylene (co)polymer in the presence of a ZN catalyst capable of retaining at the same time a good hydrogen sensitivity and a capability to homogeneously distribute the comonomer. The applicant has surprisingly found that the above is obtained when the said process is carried out in the presence of a catalyst system comprising (i) a solid catalyst component comprising Mg, Ti, halogen, and optionally an internal electron donor compound (ID), and (ii) an Al-alkyl compound said process comprising at least two step of polymerization (a) and (b), in which:

in a first step (a) ethylene is polymerized in the presence of a molecular weight regulator in order to produce a ethylene (co)polymer; and in a further step (b), which is carried out in the presence of an outside electron donor (OD) compound added to this polymerization step as a fresh reactant, ethylene is copolymerized with an alpha olefin of formula $CH_2$=CHR, in which R is a C1-C20 hydrocarbon group, to produce an ethylene copolymer having a molecular weight higher than that of the (co)polymer produced in step (a).

In the present invention the term "fresh reactant" is used to mean an amount of compound which comes into contact for the first time with the reaction mixture.

The term internal electron donor compound means an electron donor which is added during the preparation of the solid catalyst component (i) and at the end of the preparation remains on said solid.

The term external electron donor compound means the electron donor compound used as a separate component in conjunction with the aluminum compound to form the catalyst system used in polymerization.

In a particular embodiment of the present invention, the solid catalyst component (i) comprises a Ti compound and a magnesium dihalide. Preferred titanium compounds are the tetrahalides or the compounds of formula $TiX_n(OR^1)_{4-n}$, where $0 \leq n \leq 3$, X is halogen, preferably chlorine, and $R^1$ is $C_1$-$C_{10}$ hydrocarbon group. Titanium tetrachloride is the preferred compound.

The magnesium dihalide is preferably $MgCl_2$ in active form which is widely known from the patent literature as a support for Ziegler-Natta catalysts. U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line.

The internal electron donor compound (ID) can be selected from alcohol, glycols, esters, ketones, amines, amides, nitriles, alkoxysilanes and ethers. Preferred electron donors are those selected from esters, ethers and ketones. Among them, particularly preferred are those selected from aliphatic ethers particularly the C2-C20 aliphatic ethers and in particular the cyclic ethers preferably having 3-5 carbon atoms such as tetrahydrofurane (THF) or dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

Preferred ketones are those of formula R"COR" in which the R" groups are, independently, a C2-C20 hydrocarbon group. Particularly preferred are the ketones in which at least one of R" is a C1-C10 alkyl group The ratios among Ti, Mg and ED may vary among broad ranges but it constitutes a preferred aspect of the present invention the use of catalyst components in which the Mg/Ti molar ratio is higher than 4 and the ED/Ti molar ratio is higher than 2. Still more preferably, the Mg/Ti molar ratio is higher than 5 and the ED/Ti molar ratio is higher than 3.

The catalyst components of the invention can be prepared according to several methods. According to one of them, the magnesium dichloride in an anhydrous state and the suitable amount of ED are milled together under conditions in which activation of the magnesium dichloride occurs. The so obtained product can be treated one or more times with a suitable amount of $TiCl_4$. This treatment is followed by washings with hydrocarbon solvents until chloride ions disappeared In an alternative method, which is preferred, the titanium compound and the Mg compound, preferably Mg dihalide, are first contacted optionally in the presence of an inert medium, in order to prepare an intermediate product, containing a titanium compound supported on Mg dihalide, that, if desired can also be isolated. Subsequently, the ED compound is then contacted with this intermediate product in order to prepare the final catalyst component.

A precursor of Mg dihalide can be used as starting Mg compound. Suitable precursors are the Lewis adducts between Mg dihalides and suitable Lewis bases. A particular and preferred class being constituted by the $MgX_2$ (R"OH)$_m$ adducts in which R" groups are C1-C20 hydrocarbon groups, preferably C1-C10 alkyl groups, X is halogen preferably chlorine and m is from 0.1 to 6, preferably from 0.5 to 3 and more preferably from 0.5 to 2. Adducts of this type can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. Nos. 4,469,648, 4,399, 054, and WO98/44009. Another useable method for the spherulization is the spray cooling described for example in U.S. Pat. Nos. 5,100,849 and 4,829,034.

Particularly interesting are the $MgCl_2.(EtOH)_m$ adducts in which m is from 0.15 to 1.7 obtained subjecting the adducts with a higher alcohol content to a thermal dealcoholation process carried out in nitrogen flow at temperatures comprised between 50 and 150° C. until the alcohol content is reduced to the above value. A process of this type is described in EP 395083.

The $MgX_2$ (R"OH)$_m$ adducts are generally converted into the corresponding halides through the reaction with dealcoholating compounds. In one of the particular embodiments of the present invention it is preferred that the dealcoholation reaction is carried out simultaneously with the step of reaction involving the use of a titanium compound. Accordingly, these adducts are reacted with the $TiX_n(OR^1)_{4-n}$, compound (or possibly mixtures thereof) mentioned above which is preferably titanium tetrachloride. The reaction with the Ti compound can be carried out by suspending the adduct in $TiCl_4$ (generally cold) the mixture is heated up to temperatures ranging from 80-130° C. and kept at this temperature for 0.5-2 hours. The treatment with the titanium compound can be carried out one or more times. Preferably, it is repeated twice. It can also be carried out in the presence of an electron donor compound as those mentioned above. At the end of the process the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated hydrocarbons. The so obtained solid intermediate can also undergo a post-treatment with particular compounds suitable to impart to it specific properties. As an example, it can be subject to a treatment with a reducing compound for example an Al-alkyl compound, in order to lower the oxidation state of the titanium compound contained in the solid.

Another example of treatment that can be carried out on the intermediate is a pre-polymerization step. The pre-polymerization can be carried out with any of the olefins $CH_2$=CHR, where R is H or a C1-C10 hydrocarbon group. In particular, it is especially preferred to pre-polymerize ethylene or propylene or mixtures thereof with one or more α-olefins, said mixtures containing up to 20% in moles of α-olefin, forming amounts of polymer from about 0.1 g up to about 1000 g per gram of solid intermediate, preferably from about 0.5 to about 100 g per gram per gram of solid intermediate. The pre-polymerization step can be carried out at temperatures from 0 to 80° C., preferably from 5 to 70° C., in the liquid or gas phase. The pre-polymerization of the intermediate with ethylene or propylene in order to produce an amount of polymer ranging from 0.5 to 20 g per gram of intermediate is particularly preferred. The pre-polymerization is carried out with the use of a suitable cocatalyst such as organoaluminum compounds that can also be used in combination with one or more external donors that are below discussed in detail.

As mentioned above, the intermediate product is then brought into contact with the ED compound under conditions able to fix on the solid an effective amount of donor. Due to the high versatility of this method, the amount of donor used can widely vary. As an example, it can be used in molar ratios with respect to the Ti content in the intermediate product ranging from 0.5 to 20 and preferably from 1 to 10. Although not strictly required the contact is typically carried out in a liquid medium such as a liquid hydrocarbon. The temperature at which the contact takes place can vary depending on the nature of the reagents. Generally, it is comprised in the range from −10° to 150° C. and preferably from 0° to 120° C. It is plain that temperatures causing the decomposition or degradation of any specific reagent should be avoided even if they fall within the generally suitable range. Also the time of the treatment can vary in dependence of other conditions such as nature of the reagents, temperature, concentration etc. As a general indication this contact step can last from 10 minutes to 10 hours more frequently from 0.5 to 5 hours. If desired, in order to further increase the final donor content, this step can be repeated one or more times. At the end of this step the solid is recovered by separation of the suspension via the conventional methods (such as settling and removing of the liquid, filtration, centrifugation) and can be subject to washings with solvents. Although the washings are typically carried out with inert hydrocarbon liquids, it is also possible to use more polar solvents (having for example a higher dielectric constant) such as halogenated or oxygenated hydrocarbons.

Also in this case the so obtained solid can undergo a post-treatment with particular compounds suitable to impart to it specific properties. As an example it can be subject to a treatment with a reducing compound for example an Al-alkyl compound, in order to lower the oxidation state of the titanium compound contained in the solid.

The alkyl-Al compound (ii) used in the process of the present invention can be selected from the trialkyl aluminum compounds such as for example trimethylaluminum (TMA), triethylaluminum (TEAL), triisobutylaluminum (TIBA), tri-n-butylaluminum, tri-n-hexylaluminum, tri-n-octylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used. It is also possible to use, and in certain cases preferred, mixtures of trialkylaluminum's with alkylaluminum halides. Among them mixtures TEAL/DEAC and TIBA/DEAC are particularly preferred.

The above mentioned components (i), and (ii) can be fed separately into the reactor where, under the polymerization conditions can exploit their activity. It constitutes however a particular advantageous embodiment the pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C. In addition it could be also possible to introduce the Al-alkyl compound(s) (ii) into the polymerization reactors in two or more aliquots. As an example, a first aliquot can be used to form the catalysts system in the precontact section together with the component (i) and then introduced into the reactor for the polymerization step (a) and a second aliquot can be added to the system in the further step (b).

The above described catalyst system can be used directly in the main polymerization process or alternatively, it can be pre-polymerized beforehand. A pre-polymerization step is usually preferred when the main polymerization process is carried out in the gas phase. The prepolymerization can be carried out with any of the olefins $CH_2=CHR$, where R is H or a C1-C10 hydrocarbon group. In particular, it is especially preferred to pre-polymerize ethylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from 0 to 80° C., preferably from 5 to 70° C., in the liquid or gas phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred.

The process of the present invention can be carried out with different polymerization techniques provided that the above mentioned requirements for polymerization step (a) and (b) are met. The polymerization process can be carried out in solution, slurry or gas-phase in accordance with what is generally known in the art. The polymerization process carried out in gas-phase is the preferred one. Accordingly, the following detailed information about polymerization conditions are referred particularly to the gas-phase polymerization. However, it is within the skills of the skilled in the art to apply the same principles and determine the most suitable conditions when the polymerization is carried out according to the other mentioned polymerization techniques. The gas-phase reactor in which the process is carried out can be fluidized bed reactors or mechanically stirred bed reactors both of which are very well known in the art. In addition, the process can also be carried out in two serially interconnected gas-phase reactors. These reactors are described in Patent Application WO 00/02929 and are characterized by two interconnected polymerization zones, in which the polymer particles flow under different fluidization conditions and reactants composition.

In the first polymerization zone (riser), fast fluidization conditions are established by feeding a gas mixture comprising one or more α-olefins at a velocity higher than the transport velocity of the polymer particles. The velocity of said gas mixture is preferably comprised between 0.5 and 15 m/s, more preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid are reached (mass of polymer per volume of reactor), which approach the bulk density of the polymer. In other words, the polymer flows vertically down through the downcomer in a plug flow (packed flow mode), so that only small quantities of gas are entrained between the polymer particles.

It is also possible to combine different types of gas-phase reactors, for example a fluidized gas-phase reactor can be associated to a reactor having two interconnected polymerization zones. In any case, it is preferred according to the present invention to carry out polymerization step (a) and (b) in two separated reactors that, preferably, are fluidized bed reactors. As mentioned above, the polymerization of ethylene in the presence of the molecular weight regulator to produce a an ethylene polymer (step a) is performed upstream the copolymerization of ethylene with an α-olefin comonomer to produce an ethylene copolymer having higher molecular weight (step b) with respect to the polymer produced in step (a). To this aim, in step (a) a gaseous mixture comprising ethylene, molecular weight regulator and an inert gas is fed to a first gas-phase reactor. Hydrogen is preferably used as molecular weight regulator. Preferably, no comonomer is fed to said first gas phase reactor and a highly crystalline ethylene homopolymer is obtained in step (a). However, a minimal amount of comonomer may be fed with the proviso that the degree of copolymerization in step (a) is limited so that the density of the ethylene polymer obtained in step a) is not less than 0.955 $kg/dm^3$, preferably not less than 0.960 $kg/dm^3$, otherwise the distinction between the relatively low molecular weight polymer produced in step (a) and the relatively high molecular weight polymer produced in step (b) is reduced.

The skilled in the art realizes that preferably step (a) takes place under conditions that do not prevent the effect of the molecular weight regulator, i.e., the production of a relatively low molecular weight polymer. In order to do so, the use of agents negatively affecting the hydrogen response of the catalyst should, carefully considered. Examples of agents affecting the hydrogen response in connection with ethylene polymerization, is that of the electron donor compounds particularly when used as outside donors. Accordingly, in the step (a), when relatively low molecular weight ethylene polymers are produced, the amount of electron donors added as fresh reactants or coming from a previous step must be kept as low as possible. Generally, the introduction of OD in the polymerization step (a) should be avoided. However, it may occur cases in which the presence of an OD is needed also in this polymerization step. Also in these cases however, it is advisable to limit as far as possible the amount of OD. Particularly, it can be used in amounts such that the Al-alkyl cocatalyst/donor weight ratio is higher than 50 and preferably higher than 70. In these situations, the OD donor can be added directly to the reactor in which polymerization step (a) takes place or, preferably, can be precontacted beforehand with the components (i) and (ii) to form the catalyst system. Moreover, in these cases the amount of OD used in step (b) should be higher than that used in step (a). Preferably, the weight ratio between the amount of OD used in step (b) and that used in step (a) is 2 or higher. Hydrogen is fed in an amount depending on the catalyst system and, in any case, suitable to obtain in step a) an ethylene polymer with an average molecular weight between 20,000 and 60,000 g/mol and melt flow rate MIE (ASTM D1238, condition 190° C./2.16 Kg) in the range of 10 to 400 g/10 min, preferably 100 to 200 g/10 min. The melt flow rate, commonly referred to as melt index MI, is inversely indicative of the molecular weight of the polymer. In other words, a low melt index is indicative of a high molecular weight for the polyethylene, and vice versa. In order to obtain the above MIE range, in step a) the hydrogen/ethylene molar ratio is comprised between 0.5 and 5, preferably 1.0 and 3.0, the ethylene monomer being comprised from 5 to 50% by mole, preferably from 5 to 30% by mole, based on the total molar amount of gas present in the first polymerization reactor. The remaining portion of the feeding mixture is represented by inert gases and one or more $C_3$-$C_{12}$ α-olefin comonomer if any. Inert gases which are necessary to dissipate the heat generated by the polymerization reaction are conveniently selected from nitrogen or saturated hydrocarbons, the most preferred being propane.

The operating temperature in the reactor of step a) is selected between 50 and 120° C., preferably between 60 and 100° C., while the operating pressure is between 0.5 and 10 MPa, preferably between 2.0 and 3.5 MPa.

The ethylene polymer obtained in step (a) can represent from 40 to 65% by weight, preferably from 45 to 55% by weight, of the total ethylene polymer produced in the overall process.

The ethylene polymer obtained in step (a) is discharged from the reactor and the entrained gases are then passed through a solid/gas separation step, in order to avoid the gaseous mixture coming from the first polymerization reactor from entering the reactor of step (b) (second gas-phase polymerization reactor). Said gaseous mixture can be recycled back to the first polymerization reactor, while the separated ethylene polymer is fed to the reactor of step (b). In case this second reactor is of the type having two interconnected polymerization zones, a suitable point of feeding of the polymer into the second reactor is on the connecting part between the downcomer and the riser, wherein the solid concentration is particularly low, so that the flow conditions are not negatively affected. As mentioned above, in this polymerization step an amount of (OD) donor must be added as a fresh reactant in order to obtain a final polymer having good quality. The OD compound can be equal to, or different from, the ED compound described above and can be selected among alcohol, glycols, esters, ketones, amines, amides, nitriles, alkoxysilanes and ethers. The electron donor compounds (ID) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms such as tetrahydrofurane (THF), dioxane. Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

Preferred alkoxysilanes are those of formula $R_a^5 R_b^6 Si(OR^7)_c$, where a and b are integer from 0 to 2, c is an integer from 1 to 4 and the sum (a+b+c) is 4; $R^5$, $R^6$, and $R^7$, are alkyl, cycloalkyl or aryl radicals with 1-18 carbon atoms optionally containing heteroatoms. Particularly preferred are the silicon compounds in which a is 0 or 1, c is 2 or 3, $R^6$ is an alkyl or cycloalkyl group, optionally containing heteroatoms, and $R^7$ is methyl. Examples of such preferred silicon compounds are methyltrimethoxysilane, dimethyldimethoxysilane, trimethylmethoxysilane and t-butyltrimethoxysilane.

Preferred ketones are those of formula R"COR" in which the R" groups are, independently, a C2-C20 hydrocarbon group. Particularly preferred are the ketones in which at least one of R" is a C1-C10 alkyl group.

Preferred alcohol are those of formula $R^3OH"$ in which the $R^3$ group is a C1-C20 hydrocarbon group. Preferably, $R^3$ is a C1-C10 alkyl group. Specific examples are methanol, ethanol, isopropanol and butanol.

Preferred amines are those of formula $NR_3^4$ in which the $R^4$ groups, are, independently, hydrogen or a C1-C20 hydrocarbon group with the proviso that they are not contemporaneously hydrogen. Preferably, $R^4$ is a C1-C10 alkyl group. Specific examples are dietilamine, diisopropylamine and triethylamine Preferred amides are those of formula $R^5CONR_2^6$ in which $R^5$ and $R^6$ are, independently, hydrogen or a C1-C20 hydrocarbon group. Specific examples are formamide and acetamide. Preferred nitriles are those of formula $R^3CN$ where $R^3$ has the same meaning given above. A specific example is acetonitrile.

Preferred glycol are those having a total number of carbon atoms lower than 50. Among them particularly preferred are the 1,2 or 1,3 glycol having a total number of carbon atoms lower than 25. Specific examples are ethylenglycol, 1,2-propylenglycol and 1,3-propylenglycol. The use of tetrahydrofurane is especially preferred. The electron donor is used in amounts such as to give total Al/donor molar ratios ranging from 1 to 100 and preferably from 5 to 60.

The operating temperature in step (b) is in the range of 65 to 95° C., and the pressure is in the range of 1.5 to 4.0 MPa. The second gas-phase reactor is aimed to produce a relatively high molecular weight ethylene copolymer by copolymerizing ethylene with an α-olefinic comonomer comprising from 3 to 12 carbon atoms. The comonomer may be selected from 1-butene, 1-pentene, 1-hexene, 4-methyl-1-pentene, 1-heptene and 1-octene. Preferably, the comonomer is selected from 1-butene, 1-hexene and 1-octene, more preferably the comonomer is 1-butene and/or 1-hexene.

As the polymerization step (b) must produce a copolymer having a molecular weight higher than that of the (co)polymer produced in step (a), it is suitable to limit as much as possible the use of the molecular weight regulator in said step (b). The relatively high molecular weight polymer fraction produced in this step has an average molecular weight ranging from 100000 to 1,000,000 g/mol, preferably from 300,000 to 600,000 g/mol.

Furthermore, in order to broaden out the molecular weight distribution of the final ethylene polymer, the reactor of step b) can be conveniently operated by establishing additionally different conditions, such as polymerization temperature, with respect to step (a).

If step (b) is carried out in a reactor having interconnected polymerization zones, different polymerization conditions can be established in the riser and the downcomer.

To this purpose, the gas mixture entraining the polymer particles and coming from the riser can be partially or totally prevented from entering the downcomer, so that to obtain two different gas composition zones. This can be achieved by feeding a gas and/or a liquid mixture into the downcomer through a line placed at a suitable point of the downcomer, preferably in the upper part thereof. Said gas and/or liquid mixture should have a suitable composition, different from that of the gas mixture present in the riser. The flow of said gas and/or liquid mixture can be regulated so that an upward flow of gas counter-current to the flow of the polymer particles is generated, particularly at the top thereof, acting as a barrier to the gas mixture entrained among the polymer particles coming from the riser. In particular, it is advantageous to feed a mixture with low content of hydrogen in order to produce the higher molecular weight polymer fraction in the downcomer. One or more comonomers can be fed to the downcomer of step (b), optionally together with ethylene, propane or other inert gases.

When hydrogen is used, the hydrogen/ethylene molar ratio in the downcomer of step (b) is comprised between 0.005 and 0.2, the ethylene concentration being comprised from 1 to 20%, preferably 3-10%, by volume, the comonomer concentration being comprised from 0.3 to 5% by volume, based on the total volume of gas present in said downcomer. The rest is propane or similar inert gases. Since a very low molar concentration of hydrogen is present in the downcomer, by carrying out the process of the present invention is possible to bond a surprisingly high amount of comonomer to the relatively high molecular weight polyethylene fraction.

The polymer particles coming from the downcomer are reintroduced in the riser of step (b). Since the polymer particles keep reacting and no more comonomer is fed to the riser, the concentration of said comonomer drops to a range of 0.1 to 3% by volume, based on the total volume of gas present in said riser. In practice, the comonomer content can be controlled in order to obtain the desired density of the final polyethylene. When hydrogen is used in the riser of step (b) the hydrogen/ethylene molar ratio is in the range of 0.05 to 0.3, the ethylene concentration being comprised between 5 and 15% by volume based on the total volume of gas present in said riser. The rest is propane or other inert gases.

As it is known in the art, further specific agents, such as antistatic, antifouling can be used in either or both of polymerization step (a) and (b).

As mentioned above, the final polymer is the result of the polymerization in the reactors of step (a) and step (b). In particular, the final polymer comprises a high crystallinity, relatively low molecular weight ethylene polymer formed in step (a) and mixed with a relatively high molecular weight ethylene copolymer produced in step (b). In addition, the polymerization process of the invention allows to obtain an ethylene polymer endowed with a broad molecular weight distribution, particularly at least bi-modal and, as explained above, possibly tri-modal when a reactor having interconnected polymerization zones is used for polymerization step (b). In the latter case will be obtained a relatively low, high and very-high molecular weights, in the reactor of step a), in the riser of step b) and in the downcomer of step b), respectively.

According to an alternative embodiment of the present invention, it is possible to run the polymerization process so that also the reactor of polymerization step (a) is of the type having interconnected polymerization zones operating under different conditions of monomers and hydrogen concentration within the riser and the downcomer. Therefore, it is possible to feed the downcomer of step (a) with a gas and/or a liquid having a composition different from that of the gas mixture present in riser. Advantageously, a mixture with a relatively low content of hydrogen can be fed to the upper part of said downcomer, in order to produce an ethylene polymer with an average molecular weight higher than that produced in the riser. In this case, step (a) produces a bimodal polyethylene so that the final polymer is endowed with at least a quadrimodal MWD.

The polymerization process of the present invention allows to bond an increased amount of comonomer only to the relatively high molecular weight polymer fraction thus obtaining ethylene polymers with enhanced mechanical properties and stress-crack resistance.

The stress cracking resistance of the ethylene polymers obtained by the process of the present invention can be evaluated by means of the full notch creep test (FNCT). The full notch creep test (FNCT) is used mainly in Europe by resin producers for development purposes. Depending on the selected test conditions, the rupture time can be strongly reduced with respect to other test methods, such that information can be obtained on highly resistant materials in a short time. The test equipment is simple, being the usual set-up for a tensile creep test. A sample of polymer is immersed in water or a specified surfactant solution at 80° C. or 95° C. The sample is notched on four sides perpendicularly to the stress direction and a constant load is applied to the sample. The time to rupture is recorded as a function of the applied stress. The ethylene polymers obtained by the process of the present invention show high values of rupture time, since a high amount of comonomer is bond to the relatively low molecular weight polyethylene fraction.

The polyethylene obtained by the process of the invention is characterized by a melt index MIF (ASTM D 1238, condition 190/21,6) in the range of 5 to 40 g/10 min, preferably 10 to 15 g/10 min, and a melt index MIP (ASTM D 1238, 190/5) in the range of 0.1 to 1 g/10 min, preferably 0.15 to 0.6 g/10 min, so that the MIF/MIP ratio is in the range of 10 to 50, preferably 20 to 40. As known, a similar range of MIF/MIP ratio is indicative of a polymer having a broad molecular weight distribution. Typically, the final polyethylene has a high density, comprised between 0.935 and 0.955 kg/dm$^3$, preferably between 0.945 and 0.952 kg/dm$^3$.

The ethylene polymers obtained by the process of the present invention are suitable to prepare a wide range of products, since they achieve an excellent balance of mechanical properties and processing properties. In particular, an excellent level of homogeneity is combined with high values of stress cracking resistance; furthermore, the broadening of the molecular weight distribution helps to achieve good processability and improved flow properties and shear response.

In view of these properties, the ethylene polymers obtained by the process of the present invention can be injection or blow-molded into articles, extruded and blown into films or extruded into pipes.

A particularly preferred application is the preparation of pipes able to withstand high pressure. It is conventional to express the performance under stress of polyethylene (or any other thermoplastic) pipes by means of the hoop stress to which a pipe made of polyethylene (or any other thermoplastic) is expected to be able to withstand fifty years at an ambient temperature of 20° C., using water as the test environment (ISO/TR 9080:1992). By the process hereinbefore described, it is possible to obtain PE100 (plus) pipes, i.e. polyethylene pipes able to withstand fifty years at an ambient temperature of 20° C. and a pressure of 10 MPa, The process of the invention will now be described in greater detail with reference to the following examples, being in no way limitative of the object of the invention.

EXAMPLES

Characterization

The properties stated were determined according to the following methods:

Melt index F (MIF): ASTM-D 1238, condition 190/21,6

Melt index P (MIP): ASTM-D 1238, condition 190/5

Ratio of degrees (F/P): ratio between melt index F and melt index P.

Density: ASTM-D 792.

Flexural elasticity modulus (MEF): the tests were carried out according to ASTM D-790. Stress cracking resistance according to full notch creep test (FNCT): a polymer sample (a small bar 10×10×100 mm), notched on four sides perpendicularly to the stress direction, was immersed in a water solution of ARCOPAL (2% by mole) at 95° C. A constant load of 4.5 MPa was applied to the sample lengthwise to determine the rupture time.

Example 1

Preparation of the Solid Catalyst Component

A magnesium chloride and alcohol adduct containing about 3 mols of alcohol was prepared following the method described in example 2 of U.S. Pat. No. 4,399,054, but working at 2000 RPM instead of 10000 RPM. The adduct were subject to a thermal treatment, under nitrogen stream, over a temperature range of 50-150° C. until a weight content of 25% of alcohol was reached.

Into a 500 mL four-necked round flask, purged with nitrogen, 250 mL of $TiCl_4$ were introduced at 0° C. Then, at the same temperature, 17.5 g of a spherical $MgCl_2$/EtOH adduct containing 25% wt of ethanol and prepared as described above were added under stirring. The temperature was raised to 130° C. in 1 h and maintained for 60 min. Then, the stirring was discontinued, the solid product was allowed to settle and the supernatant liquid was siphoned off.

The solid was washed six times with anhydrous hexane (5×100 mL) at 60° C. and once at 25° C. Finally, the solid was dried under vacuum and analyzed (Ti=4.9% wt; Mg=19.4% wt).

A solid so obtained was injected into an autoclave and kept at 30° C. stirring in anhydrous hexane (the concentration of the solid was 40 g/L) under nitrogen atmosphere. The suspension was treated with an amount of a 10% wt solution of tri-ethyl-aluminium (TEA) in hexane to achieve a ratio TEA/solid=0.5 wt/wt. An amount of propylene equal to the initial quantity of the solid was then slowly fed with a rate suitable to keep the temperature constant at 30° C. After 30 minutes the polymerization was stopped.

In a 500 mL four-necked round flask equipped with a mechanical stirrer and purged with nitrogen, 200 mL of anhydrous hexane and 10 g of the prepolymer obtained as described above were charged at room temperature. At the same temperature, under stirring an amount of AcOEt to achieve a molar AcOEt/Ti ratio of 8 was added dropwise. The temperature was raised to 50° C. and the mixture was stirred for 3 hours. Then, the stirring was discontinued, the solid product was allowed to settle and the supernatant liquid was siphoned off.

The solid was washed 3 times with anhydrous hexane (3×100 mL) at 25° C., recovered, and dried under vacuum.

Polymerization

The polymerization process was carried out in a plant working continuously and basically equipped with a small reactor (pre-contacting pot) in which the catalyst components are mixed to form the catalytic system, a second vessel receiving the catalytic system formed in the previous step also equipped with mixing means, and two fluidized bed reactors (polymerization reactors) which are kept under fluidization conditions with propane.

The following reactants are fed to the pre-contacting pot:
the solid catalyst component prepared as described above
liquid propane as diluent
a solution of aluminum alkyl compound and, optionally,
a portion of the ED compound The temperature is normally in the range of 10-60° C. and the residence time ranges from 10 to 40 minutes. The so obtained catalytic system was directly fed from the pre-contacting section (first and second vessel) to the first gas-phase fluidized bed reactor operated at under the conditions reported in Table 1. The polymer produced in the first gas-phase reactor was then transferred to a second gas-phase reactor working under conditions reported in Table 1.

In all the runs the polymer discharged from the final reactor was first transferred to the steaming section and then dried at 70° C. under a nitrogen flow and weighted. The polymer properties are reported in table 2.

The final product was then formed into a small bar (10× 10×100 mm) which was subjected to the full notch creep test (FNCT) at a load of 4.5 MPa and a temperature of 95° C. according to the method described above.

TABLE 1

| | Pre-contacting | | | | | | |
|---|---|---|---|---|---|---|---|
| | 1st Vessel | | | | | 2nd vessel | |
| Ex | Cat. (g/h) | $AlR_3$ type | $AlR_3$/ Cat. (g/g) | Time (min) | T (° C.) | Time (min) | T° (° C.) |
| 1 | 19 | TIBA | 3.7 | 30 | 50 | 60 | 50 |
| 2 | 15.2 | TIBA | 5.3 | 30 | 50 | 60 | 50 |

| | First Fluidized bed reactor | | | | | |
|---|---|---|---|---|---|---|
| Ex | $C_2^-$ (mol %) | $H_2/C_2^-$ (mol | Time (hr) | P barg | T (° C.) | Yield (Kg/h) |
| 1 | 13 | 2.2 | 4.5 | 24 | 80 | 34 |
| 2 | 11.6 | 2.3 | 3.4 | 24 | 80 | 37 |

TABLE 1-continued

Second Fluidized-bed reactor

| Ex | Time (hr) | P barg | $C_2H_4$ (mol %) | $H_2/C_2^-$ (mol) | *$C_\alpha^-/C_4^- + C_2^-$ (mol/mol) | $THF/AlR_3$ wt | T (°C.) | Yield (Kg/h) |
|---|---|---|---|---|---|---|---|---|
| 1 | 3.3 | 24 | 9 | 0.04 | 0.27 | 0.02 | 75 | 60 |
| 2 | 3.9 | 24 | 12 | 0.03 | 0.14 | 0.02 | 85 | 71 |

*Cα is butene-1 in Ex. 1 and hexene-1 in Ex. 2.

TABLE 2

Final polymer

|  | Example 1 | Example 2 |
|---|---|---|
| MIP (g/10') | 0.26 | 0.27 |
| MIF/MIP | 30.4 | 25 |
| Density (Kg/dm³) | 0.9487 | 0.9490 |
| MEF (Mpa) | 1010 | 1064 |
| Time for Failure (hrs) - FNCT @ 95° C., 4.5 Mpa | 780 | >1500 |

The invention claimed is:

1. A process for preparing ethylene polymers carried out in the presence of a catalyst system comprising (i) a solid catalyst component comprising Mg, Ti, halogen, and optionally an internal electron donor compound (ID), and (ii) an Al-alkyl compound; said process comprising at least two steps of polymerization (a) and (b), in which:
   in a first step (a) ethylene is polymerized in the presence of a molecular weight regulator in order to produce an ethylene (co)polymer; and
   in a further step (b), which is carried out in the presence of an external electron donor compound (OD) selected from aliphatic ethers, esters and alkoxysilanes, added to this polymerization step as a fresh reactant, ethylene is copolymerized with an alpha olefin comonomer of formula $CH_2$=CHR, in which R is a C1-C20 hydrocarbon group, to produce an ethylene copolymer having a molecular weight higher than that of the ethylene (co)polymer produced in step (a),
wherein the polymerization is carried out in the gas phase, and the ethylene polymers comprise an MIF/MIP ratio from 10 to 50.

2. The process according to claim 1 in which the solid catalyst component (i) comprises a Ti compound and a magnesium dihalide.

3. The process according to claim 1 in which the solid catalyst component (i) further comprises an internal electron donor compound (ID) selected from alcohol, glycols, esters, ketones, amines, amides, nitriles, alkoxysilanes and ethers.

4. The process according to claim 3 in which the internal electron donor compound (ID) is tetrahydrofurane or ethylacetate.

5. A process for preparing ethylene polymers carried out in the presence of a catalyst system comprising (i) a solid catalyst component comprising Mg, Ti, halogen, and optionally an internal electron donor compound (ID), and (ii) an Al-alkyl compound; said process comprising at least two steps of polymerization (a) and (b), in which:
   in a first step (a) ethylene is polymerized in the presence of a molecular weight regulator in order to produce an ethylene (co)polymer; and
   in a further step (b), which is carried out in the presence of THF as an external electron donor compound (OD) added to this polymerization step as a fresh reactant, ethylene is copolymerized with an alpha olefin comonomer of formula $CH_2$=CHR, in which R is a C1-C20 hydrocarbon group, to produce an ethylene copolymer having a molecular weight higher than that of the ethylene (co)polymer produced in step (a),
wherein the polymerization is carried out in the gas phase, and the ethylene polymers comprise an MIF/MIP ratio from 10 to 50.

6. The process of claim 1 in which the polymerization steps (a) and (b) are carried out in two fluidized bed reactors.

7. The process of claim 1 in which the polymerization step (a) is carried out in a fluidized bed reactor, and the step (b) is carried out in a gas-phase reactor having two interconnected polymerization zones.

8. The process according to claim 1 in which the polymerization step (a) is carried out in the presence of hydrogen.

9. The process according to claim 1 in which the alpha-olefin comonomer used in polymerization step (b) is selected from 1-butene, 1-pentene, 1-hexene, 4-methyl-1-pentene, 1-heptene and 1-octene.

10. The process according to claim 1 in which the alkyl-Al compound (II) is selected from trialkyl aluminum compounds.

11. The process according to claim 10 in which the trialkyl aluminum compound is used in mixture with alkylaluminum halides.

12. The process according to claim 1 in which the components (i), (ii), and optionally the external electron donor compound (OD) are pre-contacted before being introduced into a reactor, for a period of time ranging from 0.1 to 120 minutes at a temperature ranging from 0 to 90° C.

13. The process according the claim 1 in which in the polymerization step (a) is produced an ethylene polymer having a density not less than 0.955 kg/dm³ and in the copolymerization step (b) the copolymer produced has an average molecular weight ranging from 100000 to 1,000,000 g/mol.

14. The process according to claim 1 in which the external electron donor compound is selected from C2-C20 aliphatic ethers.

15. The process according to claim 14 in which the external electron donor compound is selected from cyclic ethers having 3-5 carbon atoms.

16. The process according to claim 15 in which the external electron donor compound is tetrahydrofurane (THF).

* * * * *